US011177751B2

United States Patent
Min et al.

(10) Patent No.: US 11,177,751 B2
(45) Date of Patent: Nov. 16, 2021

(54) MOTOR CONTROLLER, ACTIVE SHORT CIRCUIT THEREOF, AND METHOD FOR CONTROLLING ACTIVE SHORT VIA THE SAME

(71) Applicant: SUNGROW POWER SUPPLY CO., LTD., Anhui (CN)

(72) Inventors: Yang Min, Anhui (CN); Wenjie Chen, Anhui (CN)

(73) Assignee: SUNGROW POWER SUPPLY CO., LTD., Anhui (CN)

(*) Notice: Subject to any disclaimer, the term of this patent is extended or adjusted under 35 U.S.C. 154(b) by 0 days.

(21) Appl. No.: 16/794,641

(22) Filed: Feb. 19, 2020

(65) Prior Publication Data
US 2020/0295692 A1    Sep. 17, 2020

(30) Foreign Application Priority Data
Mar. 13, 2019   (CN) .......................... 201910188229.5

(51) Int. Cl.
H02P 21/22    (2016.01)
H02P 27/06    (2006.01)
(Continued)

(52) U.S. Cl.
CPC ............ H02P 21/22 (2016.02); B60L 3/0061 (2013.01); H02M 7/53873 (2013.01); H02P 6/12 (2013.01);
(Continued)

(58) Field of Classification Search
CPC .......... H02P 29/024; H02P 6/28; H02P 21/22; H02P 27/06; H02P 21/141; H02P 25/022;
(Continued)

(56) References Cited

U.S. PATENT DOCUMENTS 7,545,111 B2 * 6/2009 Fu ........................... G01R 31/24
                                                      318/276
8,035,934 B2 * 10/2011 Inoue ........................ F16H 61/12
                                                      361/31
(Continued)

FOREIGN PATENT DOCUMENTS

CN    102403856 A    4/2012
CN    103563237 A    2/2014
(Continued)

OTHER PUBLICATIONS

EPO Extended Search Report for corresponding EP Application No. 20158092.5, dated Jul. 20, 2020.
(Continued)

*Primary Examiner* — Thai T Dinh
(74) *Attorney, Agent, or Firm* — Cantor Colburn LLP

(57) ABSTRACT

A motor controller, an active short circuit thereof, and a method for controlling active short via the same. An enabling signal is generated and outputted in response to determining that a vehicle is to enter a safe mode and a speed of a motor exceeds a threshold. Currents of a direct-axis and a quadrature-axis of the motor are adjusted to characteristic currents according to the enabling signal. An action flag signal and a control signal that corresponds to the enabling signal are generated and outputted in response to determining that the currents of the direct-axis and the quadrature-axis are adjusted to be the characteristic currents. A driving signal corresponding to the control signal is generated and outputted according to the action flag signal. A driving circuit safely controls a corresponding switch transistor in the inverter to be turned on based on the driving signal.

8 Claims, 4 Drawing Sheets

(51) Int. Cl.
  *H02P 6/28* (2016.01)
  *H02P 6/12* (2006.01)
  *H02P 25/064* (2016.01)
  *B60L 3/00* (2019.01)
  *H02M 7/5387* (2007.01)
  *H02P 21/14* (2016.01)
  *H02P 29/024* (2016.01)
  *H02M 1/00* (2006.01)

(52) U.S. Cl.
  CPC .............. *H02P 6/28* (2016.02); *H02P 21/141* (2013.01); *H02P 25/064* (2016.02); *H02P 27/06* (2013.01); *H02P 29/027* (2013.01); *B60L 2210/42* (2013.01); *B60L 2240/429* (2013.01); *H02M 1/0006* (2021.05); *H02P 2207/05* (2013.01)

(58) Field of Classification Search
  CPC ........ H02P 25/064; H02P 29/027; H02P 6/12; B60L 2210/42; B60L 3/0061; H02M 2001/0054; H02M 7/53873
  See application file for complete search history.

(56) References Cited

U.S. PATENT DOCUMENTS

| | | | | |
|---|---|---|---|---|
| 8,497,651 | B2* | 7/2013 | Tang | .......................... H02H 7/09 318/474 |
| 8,847,536 | B2* | 9/2014 | Kumagai | ............. G01R 31/343 318/490 |
| 9,160,161 | B2* | 10/2015 | Li | ........................... H02H 3/165 |
| 9,618,582 | B2* | 4/2017 | Walters | ................... G01R 31/34 |
| 2014/0232304 | A1 | 8/2014 | Sekiya et al. | |
| 2016/0365811 | A1 | 12/2016 | Senoo | |
| 2019/0214933 | A1* | 7/2019 | Saha | ....................... H02P 27/08 |

FOREIGN PATENT DOCUMENTS

| | | | | |
|---|---|---|---|---|
| CN | 105378174 | A | | 3/2016 |
| CN | 106253778 | A | | 12/2016 |
| CN | 107395085 | A | * | 11/2017 |
| CN | 107395085 | A | | 11/2017 |
| CN | 108880344 | A | * | 11/2018 |
| CN | 108880344 | A | | 11/2018 |
| DE | 102010021865 | A1 | | 12/2011 |
| EP | 2644439 | A1 | * | 10/2013 .............. B60L 7/003 |
| EP | 2644439 | A1 | | 10/2013 |
| JP | 2009284747 | A | | 12/2009 |
| WO | 2018092435 | A1 | | 5/2018 |

OTHER PUBLICATIONS

CNIPA First Office Action for corresponding CN Patent Application No. 201910188229.5 dated May 18, 2020.

* cited by examiner

MOTOR CONTROLLER, ACTIVE SHORT CIRCUIT THEREOF, AND METHOD FOR CONTROLLING ACTIVE SHORT VIA THE SAME

CROSS-REFERENCE TO RELATED APPLICATIONS

The present invention claims priority under 35 U.S.C. § 119 to Chinese Patent Application No. 201910188229.5, filed on Mar. 13, 2019, the content of which is incorporated herein by reference.

FIELD

The present disclosure relates to the technology field of motor control, and particularly, to a motor controller, an active short circuit of the motor controller, and a method for controlling active short via the motor controller.

BACKGROUND

A motor controller serves as a key component of an electric vehicle. It is necessary to ensure that a motor is safely and effectively controlled by the motor controller during normal operation, and the vehicle is as safe as possible when subject to a collision or other failures. A counter electromotive force of a vehicle-based permanent magnet synchronous motor is very large when the vehicle runs at a high speed. Hence, in a case that all switch transistors in a three-phase bridge inverter for the vehicle-based permanent magnet synchronous motor are directly turned off, the large counter electromotive force results in an overvoltage on a direct-current bus and generates excessive brake torque. The switch transistors in the inverter may be damaged due to the overvoltage on the direct-current bus. A battery may be overcharged or even explode, and a turn-over risk of the vehicle is increased, due to the excessive brake torque. Therefore, it is necessary to apply a solution based on active short circuit (ASC), that is, three switch transistors in an upper bridge arm or a lower bridge arm of the inverter are all turned on, so as to short out stator windings of the motor. Thereby, the vehicle can be safe even in case of collisions or other failures.

When a vehicle is subject to collisions or other failures, the ACS solution in conventional technology usually performs an ASC operation directly via a micro-controller or via a redundant circuit in a case that the microcontroller fails, or performs an ASC operation after the vehicle decelerates to a suitable speed. At a moment of the ASC operation being performed, an impulse current about twice a steady current is generated in the stator windings due to the counter electromotive force of the motor. The inverter may be damaged when the impulse current flows across a switch transistor in the inverter.

SUMMARY

A motor controller, an active short circuit of the motor controller, and a method for controlling active short via the motor controller, are provided according to embodiments of the present disclosure, in order to address an issue that a switching device is damaged by an impulse current due to an operation of the active short circuit.

To achieve the above objective, following technical solutions are provided.

A method for controlling active short via a motor controller is provided, including: generating and outputting an enabling signal, in response to determining that a vehicle is to enter a safe mode and a speed of a motor exceeds a threshold, where the enabling signal is configured to enable all switch transistors in an upper bridge arm or a lower bridge arm of an inverter to be turned on; adjusting a current of a direct-axis of the motor and a current of a quadrature-axis of the motor to characteristic currents, according to the enabling signal; generating and outputting an action flag signal, and a control signal that corresponds to the enabling signal, in response to determining that the current of the direct-axis and the current of the quadrature-axis are adjusted to be the characteristic currents; generating and outputting a driving signal corresponding to the control signal, according to the action flag signal; controlling, via a driving circuit, a corresponding switch transistor in the inverter to be turned on based on the driving signal.

In one embodiment, adjusting the current of the direct-axis of the motor and the current of the quadrature-axis of the motor to characteristic currents includes: adjusting, within a preset control period, the current of the direct-axis of the motor and the current of the quadrature-axis of the motor to be the characteristic currents, through stepwise adjustment, filter processing, or ramp-change adjustment.

In one embodiment, determining that the current of the direct-axis and the current of the quadrature-axis are adjusted to be the characteristic currents includes: determining whether a period timed by a timer is greater than or equal to a preset delay period, in response to determining that the motor controller is not in a state of the active short being activated, where the preset delay period is greater than the preset control period; and determining that the current of the direct-axis and the current of the quadrature-axis are adjusted to be the characteristic currents, in response to the period timed by the timer being greater than or equal to the preset delay period.

In one embodiment, the characteristic currents are:

$$\begin{cases} Idref = -Flux/Ld \\ Iqref = 0 \end{cases},$$

where Idref is the current of the direct-axis, Iqref is the current of the quadrature-axis, Flux is a flux linkage of a permanent magnet of the motor, and Ld is inductance of the direct-axis.

In one embodiment, before generating and outputting an enabling signal, the method further includes: determining that at least one switch transistor in the upper bridge arm or the lower bridge arm fails. The enabling signal is configured to enable all switch transistors in the lower bridge arm to be turned on in a case that the at least one switch transistor is in the upper bridge arm of the inverter. The enabling signal is configured to enable all switch transistors in the upper bridge arm to be turned on in a case that the at least one switch transistor is in the lower bridge arm.

An active short circuit of a motor controller is provided, including an active short enabling unit, an active short controlling unit, an active short activating unit, and a drive circuit.

The active short enabling unit is configured to generate and output an enabling signal, in response to determining that a vehicle is to enter a safe mode and a speed of a motor exceeds a threshold. The enabling signal is configured to enable all switch transistors in an upper bridge arm or a lower bridge arm of an inverter to be turned on.

The active short controlling unit is configured to adjust a current of a direct-axis of the motor and a current of a quadrature-axis of the motor to characteristic currents according to the enabling signal, and generate and output an action flag signal and a control signal that corresponds to the enabling signal, in response to determining that the current of the direct-axis and the current of the quadrature-axis are adjusted to be the characteristic currents.

The active short circuit activating unit is configured to generate and output a driving signal corresponding to the control signal, according to the action flag signal.

The driving circuit is configured to control a corresponding switch transistor in the inverter to be turned on based on the driving signal.

In one embodiment, the active short controlling unit is further configured to adjust, within a preset control period, the current of the direct-axis of the motor and the current of the quadrature-axis of the motor to be the characteristic currents, through stepwise adjustment, filter processing, or ramp-change adjustment.

In one embodiment, the active short controlling unit is further configured to: determine whether a period timed by a timer is greater than or equal to a preset delay period, in response to determining that the motor controller is not in a state of the active short being activated, wherein the preset delay period is greater than the preset control period; and determine that the current of the direct-axis and the current of the quadrature-axis are adjusted to be the characteristic currents, in response to the period timed by the timer being greater than or equal to the preset delay period.

In one embodiment, the characteristic currents are:

$$\begin{cases} Idref = -Flux/Ld \\ \quad Iqref = 0 \end{cases},$$

where Idref is the current of the direct-axis, Iqref is the current of the quadrature-axis, Flux is a flux linkage of a permanent magnet of the motor, and Ld is inductance of the direct-axis.

In one embodiment, the active short enabling unit is further configured to: determine that at least one switch transistor in the upper bridge arm or the lower bridge arm fails. The enabling signal is configured to enable all switch transistors in the lower bridge arm to be turned on in a case that the at least one switch transistor is in the upper bridge arm of the inverter. The enabling signal is configured to enable all switch transistors in the upper bridge arm to be turned on in a case that the at least one switch transistor is in the lower bridge arm.

In one embodiment, the active short controlling unit is a digital signal processing chip, and the active short activating unit is a complex programmable logic device.

A motor controller is further provided, including an inverter and any of the aforementioned active short circuits.

The inverter is a three-phase bridge inverter. A control terminal of the inverter is configured to receive the driving signal. An alternating-current side of the inverter is connected to a stator winding of the motor.

The method for controlling active short via the motor controller is provided according to embodiments of the present disclosure. The enabling signal is generated and outputted in response to determining that the vehicle is to enter the safe mode and the speed of the motor exceeds the threshold. The enabling signal is configured to enable all switch transistors in the upper bridge arm or the lower bridge arm of the inverter to be turned on. The current of the direct-axis of the motor and the current of the quadrature-axis of the motor are adjusted to characteristic currents according to the enabling signal. Thereby, output torque of the motor is reduced to zero before the active short is activated, and it is ensured that there is no excessive impulse current generated when the active short is activated. The action flag signal and the control signal that corresponds to the enabling signal are generated and outputted in response to determining that the current of the direct-axis and the current of the quadrature-axis are adjusted to be the characteristic currents. The driving signal corresponding to the control signal is generated and outputted according to the action flag signal. Thereby, the driving circuit is capable to safely control the corresponding switch transistor in the inverter to be turned on based on the driving signal after the impulse current is reduced.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

The technical solutions in the embodiments of the present disclosure will be described clearly and completely hereinafter in conjunction with the drawings in the embodiments of the present disclosure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

A method for controlling active short via a motor controller is provided, so as to address the issue that a switching device is damaged by an impulse current generated during an operation of an active short circuit.

Figure 1:
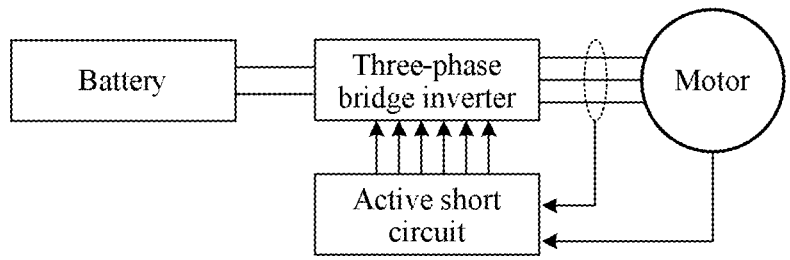
FIG. 1 is a schematic diagram of a connection relationship between an active short circuit and an inverter according to an embodiment of the present disclosure.
Figure 2:
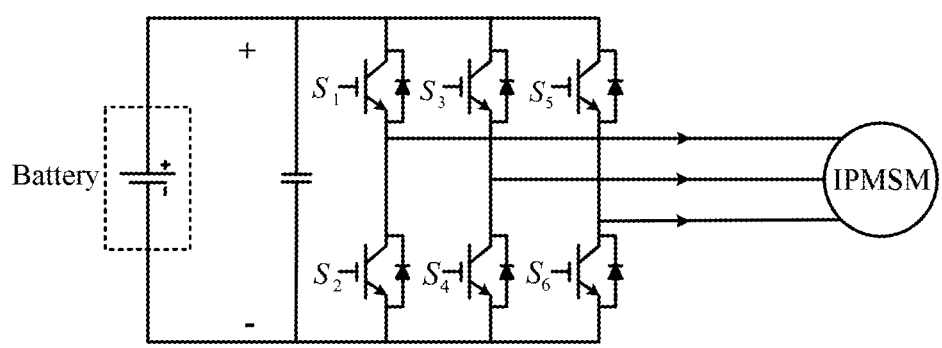
FIG. 2 is a circuit topography of a three-phase bridge inverter according to an embodiment of the present disclosure.

The method for controlling active short via the motor controller is applied to an active short circuit of the motor controller. Referring to FIG. 1, an output terminal of the active short circuit is connected to a control terminal of an inverter, a direct-current side of the inverter is connected to a battery of an electric vehicle, and an alternating-current side of the inverter is connected to a stator winding of a motor. In practice, the inverter may be a three-phase bridge inverter as shown in FIG. 2. The direct-current side of the inverter is connected to the battery, and the alternating-current side of the inverter is connected to an internal permanent magnet synchronous motor (IPMSM). An upper bridge arm of the inverter includes three switch transistors S1, S3, and S5. A lower bridge arm of the inverter includes three switch transistors S2, S4, and S6.

Figure 3:
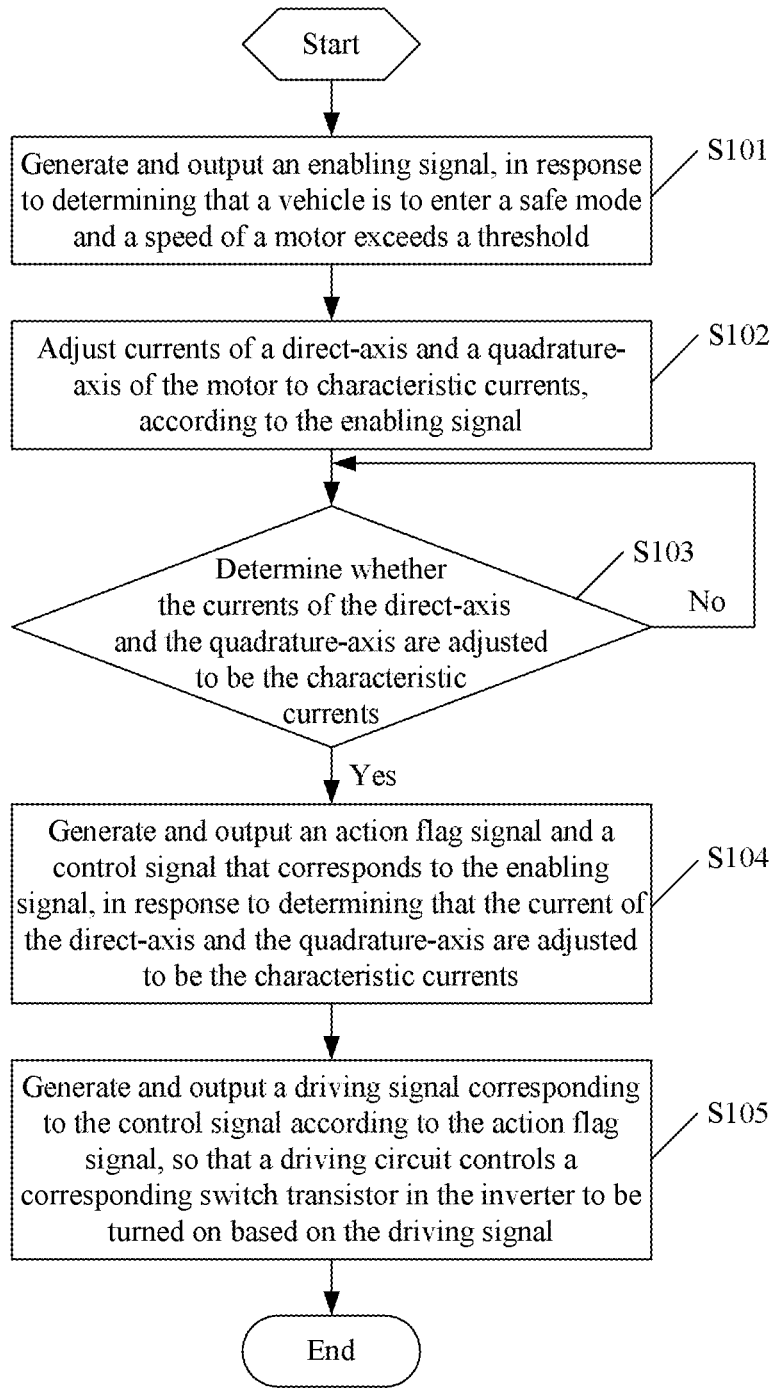
FIG. 3 is a flow chart of a method for controlling active short via a motor controller according to an embodiment of the present disclosure.

Referring to FIG. 3, the method for controlling active short via the motor controller includes following steps S101 to S105.

In step S101, an enabling signal is generated and outputted, in a case that a vehicle is to enter a safe mode and a speed of a motor exceeds a threshold.

In practice, the threshold may be set according to an application environment. The threshold is a speed set for comparison in determining whether the active short is to be activated. Then, real-time determination is made based on the currently collected speed of the motor. In a case that the speed of the motor is lower than the threshold, the active short is not to be activated. In a case that the speed of the motor is higher than the threshold and the vehicle is to enter a safe mode due to a collision or other failures, the enabling signal is generated and outputted, and it is determined that the active short is to be activated.

The enabling signal is configured to enable all switch transistors in an upper bridge arm or a lower bridge arm of an inverter to be turned on. The enabling signal is, for example, a signal enabling switch transistors S1, S3 and S5 to be turned on, or a signal enabling switch transistors S2, S4 and S6 to be turned on, as shown in FIG. 2. In practice, the enabling signal may be set according to an application environment. In one embodiment, the enabling signal is configured to enable all switch transistors in the lower bridge arm of the inverter to be turned on. The present disclosure is not limited thereto.

In step S102, a current of a direct-axis of the motor and a current of a quadrature-axis of the motor are adjusted to characteristic currents, according to the enabling signal.

Before the step S102, the characteristic currents should be calculated. In practice, the characteristic currents may be calculated based on following equations.

$$\begin{cases} Idref = -Flux/Ld \\ Iqref = 0 \end{cases}$$

Idref is the current of the direct-axis. Iqref is the current of the quadrature-axis. Flux is a flux linkage of a permanent magnet of the motor. Ld is inductance of the direct-axis.

A normal condition is that the active short is not necessary to be activated. In such case, the currents of the direct-axis and the quadrature-axis in current loops are currents under a normal operation mode, such as a torque-control mode, a speed-control mode, or a current-control mode. In a case that it is necessary to activate the active short, the step S102 is performed to adjust the currents of the direct-axis and the quadrature-axis to the characteristic currents.

An objective can be achieved based on above adjustment of the currents. Namely, output torque of the motor is reduced to zero before the active short is activated, and there would be no excessive impulse current generated when the active short is activated.

In step S103, it is determined whether the current of the direct-axis and the current of the quadrature-axis are adjusted to be the characteristic currents.

In a case that the current of the direct-axis and the current of the quadrature-axis are adjusted to be the characteristic currents, it indicates that the above objective can be achieved, and the method goes to step S104.

In step S104, an action flag signal and a control signal that corresponds to the enabling signal are generated and outputted.

The action flag signal represents the above objective being achieved, and the inverter is guaranteed to enter an active short state safely.

Correspondence of the control signal to the enabling signal refers to following. In a case that the enabling signal is configured to enable all switch transistors in the upper bridge arm of the inverter to be turned on, the control signal is configured to control all switch transistors in the upper bridge arm of the inverter to be turned on. In a case that the enabling signal is configured to enable all switch transistors in the lower bridge arm of the inverter to be turned on, the control signal is configured to control all switch transistors in the lower bridge arm of the inverter to be turned on.

In step S105, a driving signal corresponding to the control signal is generated and outputted according to the action flag signal. Thereby, a driving circuit controls a corresponding switch transistor in the inverter to be turned on based on the driving signal.

According to the action flag signal, it can be determined that the inverter can enter the active short circuit state safely. Driving signals configured to control on-or-off states of six switch transistors, respectively, are generated based on the control signal. In one embodiment, in a case that the control signal is configured to control all switch transistors in the upper bridge arm of the inverter to be turned on, the driving signal is configured to turn on all switch transistors in the upper bridge arm of the inverter and turn off all switch transistors in the lower bridge arm of the inverter. That is, the driving signal turns on three upper transistors (S1, S3, and S5) and turns off three lower transistors (S2, S4, and S6) as shown in FIG. 2. In a case that the control signal is configured to control all switch transistors in the lower bridge arm of the inverter to be turned on, the driving signal is configured to turn off all switch transistors in the upper bridge arm of the inverter and turn on all switch transistors in the lower bridge arm of the inverter. That is, the driving signal turns off three upper transistors (S1, S3, and S5) and turns on three lower transistors (S2, S4, and S6) as shown in FIG. 2.

The method for controlling active short via the motor controller is provided according to embodiments of the present disclosure. In response to determining that the vehicle is to enter the safe mode and the speed of the motor exceeds the threshold, the current of the direct-axis of the motor and the current of the quadrature-axis of the motor are adjusted to characteristic currents according to the enabling signal. Thereby, output torque of the motor is reduced to zero before the active short is activated, and it is ensured that there is no excessive impulse current generated when the active short is activated. Then, the corresponding switch transistor in the inverter is controlled to be turned on in a corresponding process, after the current of the direct-axis of the motor and the current of the quadrature-axis of the motor are adjusted to be the characteristic currents, namely, after it is determined that the impulse current would be reduced.

Based on the aforementioned embodiments and FIG. 1 to FIG. 3, another method for controlling active short via a motor controller is provided according to an embodiment of the present disclosure. In this embodiment, a preset control period and a preset delay period are set before step S102 is executed, and the preset delay period is greater than the preset control period. In such case, the step S102 of adjusting the current of the direct-axis of the motor and the current of the quadrature-axis of the motor to characteristic currents may be realized in various manners.

In a first manner, the current of the direct-axis of the motor and the current of the quadrature-axis of the motor are adjusted to be the characteristic currents within the preset control period, through stepwise adjustment.

In a second manner, the current of the direct-axis of the motor and the current of the quadrature-axis of the motor are adjusted to be the characteristic currents within the preset control period, through filter processing. Namely, the currents of the direct-axis and the quadrature-axis in current loops are filtered by a filter during switching.

In a third manner, the current of the direct-axis of the motor and the current of the quadrature-axis of the motor are adjusted to be the characteristic currents within the preset control period, through ramp-change adjustment. Namely, the currents of the direct-axis and the quadrature-axis in current loops are changed with a ramp.

A slope of the ramp change may be fixed in advance, or may be calculated based on the preset control period and an absolute value, in order to ensure that the currents of the direct-axis and the quadrature-axis are adjusted to be the characteristic currents within the preset control period. The absolute value refers to an absolute value of a difference between the characteristic currents and the currents of the direct-axis and the quadrature-axis that are collected in real time.

The step S103 of determining whether the current of the direct-axis and the current of the quadrature-axis are adjusted to be the characteristic currents further includes following steps.

It is determined whether the motor controller is in a state of the active short being activated.

It is determined whether a period timed by a timer is greater than or equal to a preset delay period, in a case that the motor controller is not in the state of the active short being activated.

It is determined that the current of the direct-axis and the current of the quadrature-axis are adjusted to be the characteristic currents, in a case that the period timed by the timer is greater than or equal to the preset delay period.

Timing of the timer starts when the step S102 starts. Namely, the timer starts timing from a start of adjusting the current of the direct-axis of the motor and the current of the quadrature-axis of the motor to characteristic currents. In conjunction with the above determination process, the preset delay period being greater than the preset control period ensures following effects. Before the active short is activated, the currents of the direct-axis and the quadrature-axis of the motor are adjusted to be the characteristic currents, and the output torque of the motor is reduced to zero. There is no excessive impulse current generated when the active short is activated.

In practice, in a case that the motor controller has already been in a state of the active short being activated, the timer does not time. Then, the state of the active short being activated is kept in a case that the period timed by the timer is greater than or equal to the preset delay period. In a case that the motor controller is not in the state of the active short being activated, the timer continues timing. Then, the motor controller may enter the state of the active short being activated and the action flag signal is outputted, in a case that the period timed by the timer is greater than or equal to the preset delay period. A flag indicating that the motor controller is not in the state of the active short being activated is outputted, in a case that the period timed by the timer is less than the preset delay period.

Specific implementations of steps S102 and S103 may depend on an application environment, which all fall within the protection scope of the present disclosure.

Other principles may refer to the foregoing embodiments, which are not repeated herein In one embodiment, before the step S101 of generating and outputting an enabling signal, the method further includes following steps.

It is determined that at least one switch transistor in the upper bridge arm or the lower bridge arm fails.

The enabling signal is configured to enable all switch transistors in the lower bridge arm to be turned on in a case that the at least one switch transistor is in the upper bridge arm of the inverter. The enabling signal is configured to enable all switch transistors in the upper bridge arm to be turned on in a case that the at least one switch transistor is in the lower bridge arm.

The active short operation may be turning on all switch transistors in either bridge arm of the inverter, and turning off all switch transistors in the other bridge arm of the inverter. In practice, the enabling signal to be sent may be determined according to a fault state of each switch transistor in the inverter, in a case that it is determined that the vehicle is to enter the safe mode and the speed of the motor exceeds the threshold. FIG. 2 is taken as an example. The enabling signal enables the three lower transistors (S2, S4, and S6) to be turned on, in a case that any of the switch transistors S1, S3, and S5 fails. The enabling signal enables the three upper transistors (S1, S3, and S5) to be turned on, in a case that any of the switch transistors S2, S4 and S6 fails. The enabling signal can enable either the three upper tubes or the three lower tubes to be turned on, in a case that none of the switch transistors fails. In one embodiment based on the last case, the enabling signal preferably enables the three lower transistors (S2, S4 and S6) to be turned on.

Figure 4:
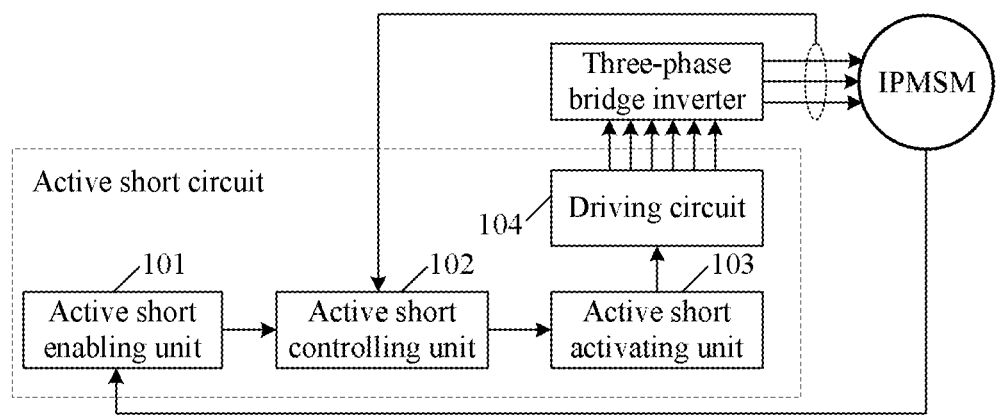
FIG. 4 is a schematic structural diagram of an active short circuit according to an embodiment of the present disclosure.

An active short circuit of a motor controller is provided according to an embodiment of the present disclosure. As an example, the active short circuit is as shown in FIG. 4, which is on the basis of FIG. 1. The active short circuit includes: an active short enabling unit 101, an active short controlling unit 102, an active short activating unit 103, and a driving circuit 104. A connection relationship between the active short circuit and an inverter is as shown in FIG. 1, which is not repeated herein.

The active short enabling unit 101 is configured to generate and output an enabling signal, in response to determining that a vehicle is to enter a safe mode and a speed of a motor exceeds a threshold. The enabling signal is configured to enable all switch transistors in an upper bridge arm or a lower bridge arm of an inverter to be turned on.

The active short controlling unit 102 is configured to adjust a current of a direct-axis of the motor and a current of a quadrature-axis of the motor to characteristic currents according to the enabling signal, and generate and output an action flag signal and a control signal that corresponds to the enabling signal, in response to determining that the current of the direct-axis and the current of the quadrature-axis are adjusted to be the characteristic currents.

The active short circuit unit 103 is configured to generate and output a driving signal corresponding to the control signal, according to the action flag signal.

The driving circuit 104 is configured to control a corresponding switch transistor in the inverter to be turned on based on the driving signal.

In practice, the active short enabling unit 101 collects a current speed of the motor in real time, and thereby determines whether the speed of the motor exceeds the threshold. The active short controlling unit 102 collects a current of the motor in real time, and thereby obtains the current currents of the direct-axis and the quadrature-axis of the motor.

In one embodiment, the active short controlling unit 102 is further configured to adjust, within a preset control period, the current of the direct-axis of the motor and the current of the quadrature-axis of the motor to be the characteristic currents, through stepwise adjustment, filter processing, or ramp-change adjustment. A slope of the ramp change may be fixed or calculated. The calculation is based on a preset control period and an absolute value. The absolute value refers to an absolute value of a difference between the characteristic currents and the currents of the direct-axis and the quadrature-axis that are collected in real time.

In one embodiment, the active short controlling unit 102 is further configured to: determine whether a period timed by a timer is greater than or equal to a preset delay period, in response to determining that the motor controller is not in a state of the active short being activated, wherein the preset delay period is greater than the preset control period; and determine that the current of the direct-axis and the current of the quadrature-axis are adjusted to be the characteristic currents, in response to the period timed by the timer being greater than or equal to the preset delay period.

In one embodiment, the characteristic currents are calculated based on following equations.

$$\begin{cases} Idref = -Flux/Ld \\ \quad Iqref = 0 \end{cases}$$

Idref is the current of the direct-axis. Iqref is the current of the quadrature-axis. Flux is a flux linkage of a permanent magnet of the motor. Ld is inductance of the direct-axis.

Figure 5:
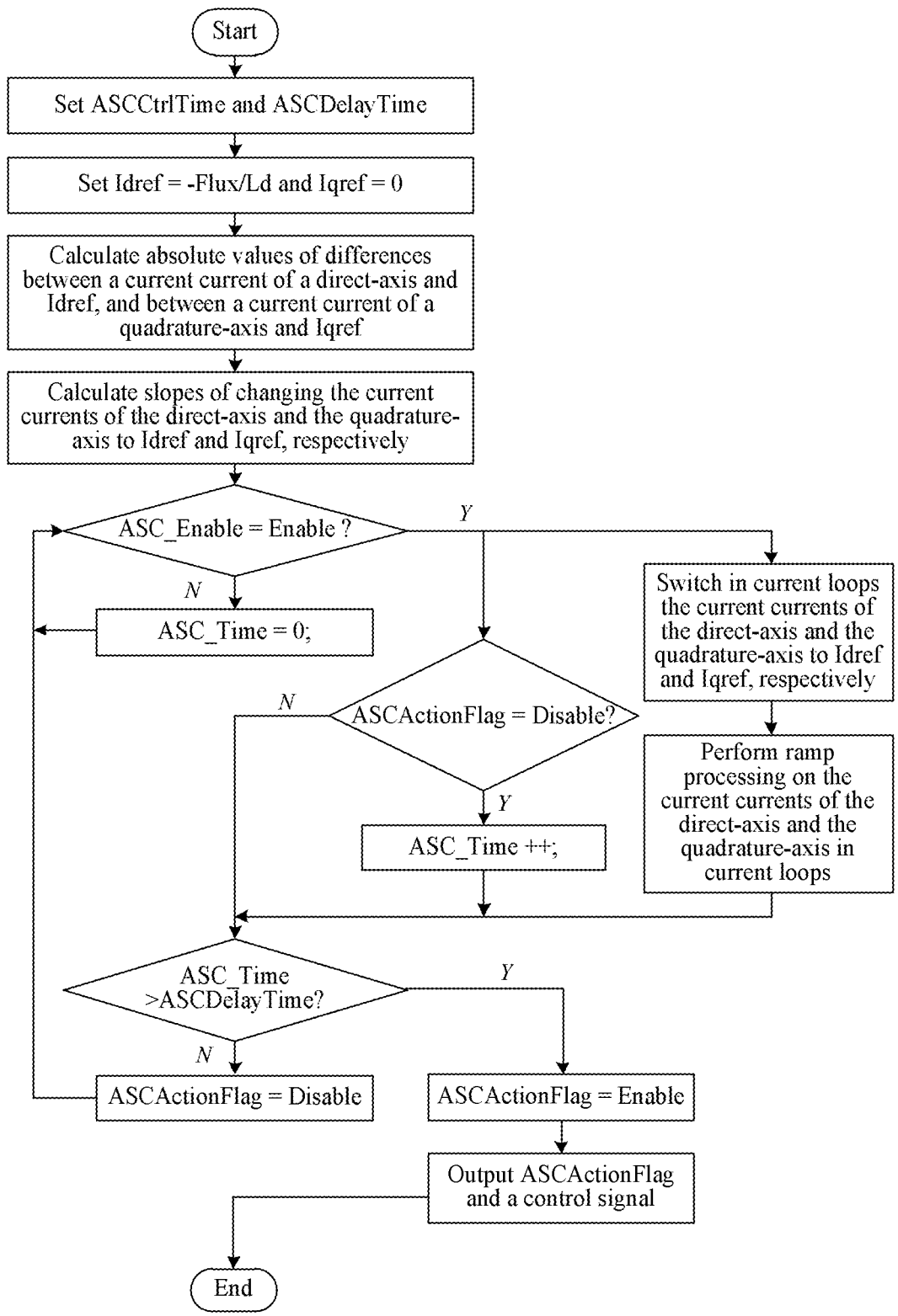
FIG. 5 is a flow chart of a working process of an active short controlling unit according to an embodiment of the present disclosure.

It is taken as an example for illustration that the slope of the ramp change is calculated. An operation process of the active short controlling unit 102 is as shown in FIG. 5. "ASCCtrlTime" is the preset control period, and "ASCDelayTime" is the preset delay period. "ASC_Enable" is an enabling flage, and "ASC_Enable=Enable" represents that the enabling signal is received. "ASCActionFlag" is a state flag of the motor controller, "ASCActionFlag=Disable" represents that the motor controller is not in a state of the active short being activated, and "ASCActionFlag=Enable" represents that the motor controller is in a state of the active short being activated and the action flag signal is generated. "ASC_Time" represents the period timed by the timer.

In one embodiment, the active short enabling unit 101 is further configured to determine that at least one switch transistor in the upper bridge arm or the lower bridge arm fails. The enabling signal is configured to enable all switch transistors in the lower bridge arm to be turned on in a case that the at least one switch transistor is in the upper bridge arm of the inverter. The enabling signal is configured to enable all switch transistors in the upper bridge arm to be turned on in a case that the at least one switch transistor is in the lower bridge arm.

In one embodiment, the active short controlling unit 102 is a digital signal processing chip. For example, the digital signal processing chip may be a digital signal processing (DSP) chip based on Texas Instruments, a control chip based on Infineon, or other digital processing chips. The active short controlling unit 102 may be selected according to an application environment, which is not limited herein, and all falls within the protection scope of present disclosure. The active short controlling unit 102 may output, via an I/O port thereof to the active short activating unit 103, the action flag signal and the control signal that corresponds to the enabling signal.

The active short activating unit 103 may be a complex programmable logic device (CPLD), or may be another logic processing protection chip. The present disclosure is not limited thereto.

The ASC operation is directly performed via a microcontroller in conventional technology. In comparison, only the active short controlling unit 102 and the active short activating unit 103 are added in these embodiments, and there is no additional redundant hardware. It is easy to implement with a low cost.

Other principles may refer to the foregoing embodiments, which are not repeated herein.

A motor controller is provided according to another embodiment of the present disclosure. Reference is made to FIG. 1, where the motor controller includes an inverter and any of the aforementioned active short circuits as shown in FIG. 4. The inverter is a three-phase bridge inverter. A control terminal of the inverter is configured to receive the driving signal. An alternating-current side of the inverter is connected to a stator winding of the motor.

A structure and a principle of the active short circuit may refer to the forgoing embodiments, which are not repeated herein.

The embodiments in this specification are described in a progressive manner. Each embodiment lays emphasis on differences from other embodiments. For the same or similar parts between the embodiments, one may refer to the description of other embodiments. Since the apparatus embodiments are similar to the apparatus embodiments, the description for the apparatus embodiment is relatively simple. For related parts, reference may be made to description in the apparatus embodiments.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence of the present disclosure without departing the content of the technical solutions of the present disclosure fall within the protection scope of the technical solutions of the present disclosure.

The invention claimed is:

1. A method for controlling active short via a motor controller, comprising:
    generating and outputting an enabling signal, in response to determining that a vehicle is to enter a safe mode and a speed of a motor exceeds a threshold, wherein the enabling signal is configured to enable all switch transistors in an upper bridge arm or a lower bridge arm of an inverter to be turned on;

adjusting a current of a direct-axis of the motor and a current of a quadrature-axis of the motor to characteristic currents, according to the enabling signal;

generating and outputting an action flag signal, and a control signal that corresponds to the enabling signal, in response to determining that the current of the direct-axis and the current of the quadrature-axis are adjusted to be the characteristic currents;

generating and outputting a driving signal corresponding to the control signal, according to the action flag signal; and controlling, via a driving circuit, a corresponding switch transistor in the inverter to be turned on based on the driving signal;

wherein adjusting the current of the direct-axis of the motor and the current of the quadrature-axis of the motor to characteristic currents comprises:

adjusting, within a preset control period, the current of the direct-axis of the motor and the current of the quadrature-axis of the motor to be the characteristic currents, through stepwise adjustment, filter processing, or ramp-change adjustment;

wherein determining that the current of the direct-axis and the current of the quadrature-axis are adjusted to be the characteristic currents comprises:

determining whether a period timed by a timer is greater than or equal to a preset delay period, in response to determining that the motor controller is not in a state of the active short being activated, wherein the preset delay period is greater than the preset control period; and determining that the current of the direct-axis and the current of the quadrature-axis are adjusted to be the characteristic currents, in response to the period timed by the timer being greater than or equal to the preset delay period.

2. The method according to claim 1, wherein the characteristic currents are:

$$\begin{cases} Idref = -Flux/Ld \\ Iqref = 0 \end{cases},$$

wherein Idref is the current of the direct-axis, Iqref is the current of the quadrature-axis, Flux is a flux linkage of a permanent magnet of the motor, and Ld is inductance of the direct-axis.

3. The method according to claim 1, wherein before generating and outputting an enabling signal, the method further comprises:

determining that at least one switch transistor in the upper bridge arm or the lower bridge arm fails;

wherein the enabling signal is configured to enable all switch transistors in the lower bridge arm to be turned on in a case that the at least one switch transistor is in the upper bridge arm of the inverter; and wherein the enabling signal is configured to enable all switch transistors in the upper bridge arm to be turned on in a case that the at least one switch transistor is in the lower bridge arm.

4. An active short circuit of a motor controller, comprising:

an active short enabling unit, configured to generate and output an enabling signal, in response to determining that a vehicle is to enter a safe mode and a speed of a motor exceeds a threshold, wherein enabling signal is configured to enable all switch transistors in an upper bridge arm or a lower bridge arm of an inverter to be turned on;

an active short controlling unit, configured to:

adjust a current of a direct-axis of the motor and a current of a quadrature-axis of the motor to characteristic currents, according to the enabling signal, and generate and output an action flag signal and a control signal that corresponds to the enabling signal, in response to determining that the current of the direct-axis and the current of the quadrature-axis are adjusted to be the characteristic currents;

an active short activating unit, configured to generate and output a driving signal corresponding to the control signal, according to the action flag signal; and a driving circuit, configured to control a corresponding switch transistor in the inverter to be turned on based on the driving signal;

wherein the active short controlling unit is further configured to:

adjust, within a preset control period, the current of the direct-axis of the motor and the current of the quadrature-axis of the motor to be the characteristic currents, through stepwise adjustment, filter processing, or ramp-change adjustment;

wherein the active short controlling unit is further configured to:

determining whether a period timed by a timer is greater than or equal to a preset delay period, in response to determining that the motor controller is not in a state of the active short being activated, wherein the preset delay period is greater than the preset control period; and determining that the current of the direct-axis and the current of the quadrature-axis are adjusted to be the characteristic currents, in response to the period timed by the timer being greater than or equal to the preset delay period.

5. The active short circuit according to claim 4, wherein the characteristic currents are:

$$\begin{cases} Idref = -Flux/Ld \\ Iqref = 0 \end{cases},$$

wherein Idref is the current of the direct-axis, Iqref is the current of the quadrature-axis, Flux is a flux linkage of a permanent magnet of the motor, and Ld is inductance of the direct-axis.

6. The active short circuit according to claim 4, wherein the active short enabling unit is further configured to:

determine that at least one switch transistor in the upper bridge arm or the lower bridge arm fails;

wherein the enabling signal is configured to enable all switch transistors in the lower bridge arm to be turned on in a case that the at least one switch transistor is in the upper bridge arm of the inverter; and wherein the enabling signal is configured to enable all switch transistors in the upper bridge arm to be turned on in a case that the at least one switch transistor is in the lower bridge arm.

7. The active short circuit according to claim 4, wherein the active short controlling unit is a digital signal processing chip, and the active short activating unit is a complex programmable logic device.

8. A motor controller, comprising:
an inverter; and
the active short circuit according to claim 4;
wherein the inverter is a three-phase bridge inverter, a control terminal of the inverter is configured to receive the driving signal, and an alternating-current side of the inverter is connected to a stator winding of the motor.

* * * * *